United States Patent [19]
Elliott

[11] 3,990,111
[45] Nov. 2, 1976

[54] DATA STORAGE APPARATUS EMPLOYING A FLEXIBLE MAGNETIC DISK

[75] Inventor: James Francis Elliott, Rochester, Minn.

[73] Assignee: International Business Machines Corporation, Armonk, N.Y.

[22] Filed: Mar. 10, 1975

[21] Appl. No.: 556,859

Related U.S. Application Data

[63] Continuation of Ser. No. 406,137, Oct. 12, 1973, abandoned.

[52] U.S. Cl. ............................................. 360/99
[51] Int. Cl.² ...................................... G11B 5/16
[58] Field of Search ............................. 360/99, 130

[56] References Cited
UNITED STATES PATENTS

| | | |
|---|---|---|
| 3,703,713 | 11/1972 | Pohm et al. .................. 360/130 |
| 3,729,720 | 4/1973 | Darling et al. ................. 360/130 |
| 3,731,292 | 9/1971 | Kelley ........................... 360/130 |

Primary Examiner—Vincent P. Canney
Attorney, Agent, or Firm—Keith T. Bleuer

[57] ABSTRACT

The data storage apparatus employs a thin flexible disk having magnetic recording surfaces on both sides and disposed in a carrying envelope. The envelope has an elongate slot in both thicknesses to permit magnetic read/write heads on the two sides of the disk to make contact with the magnetic disk surfaces. A pair of pressure pads are disposed on a first side of the envelope and are laterally spaced from the read/write head on that side for forcing the magnetic disk into contact with the read/write head on the second side of the disk. A similar pair of pads are disposed on the second side of the disk for forcing the disk against the read/write magnetic head on the first side of the disk.

3 Claims, 10 Drawing Figures

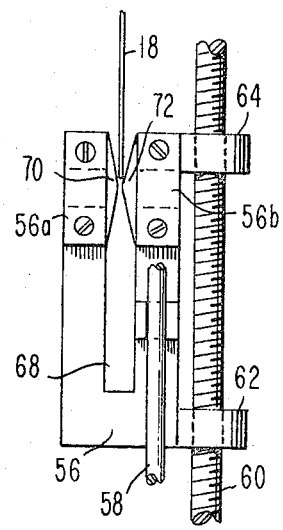
FIG. 7
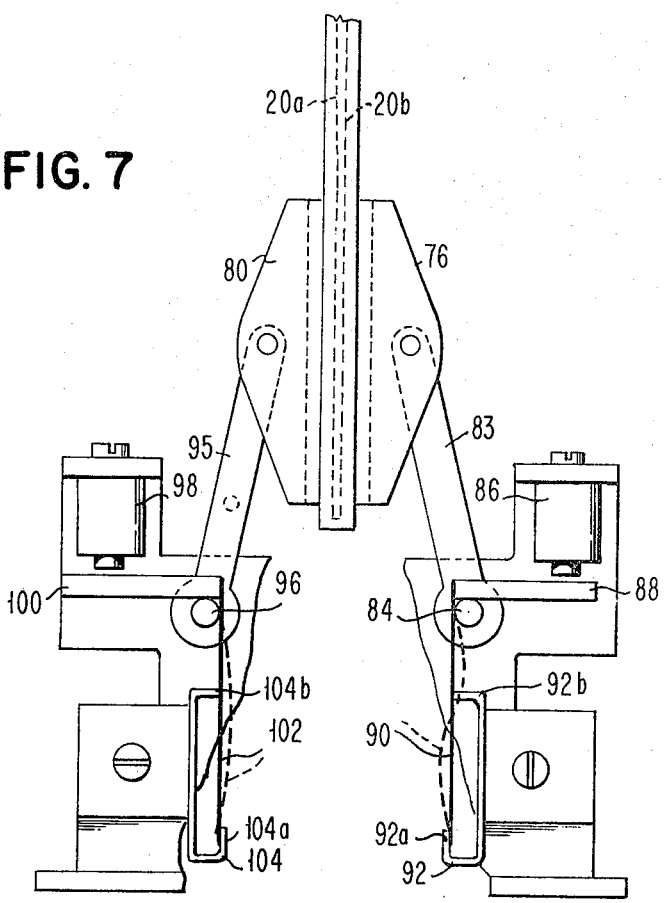
FIG. 9
FIG. 8
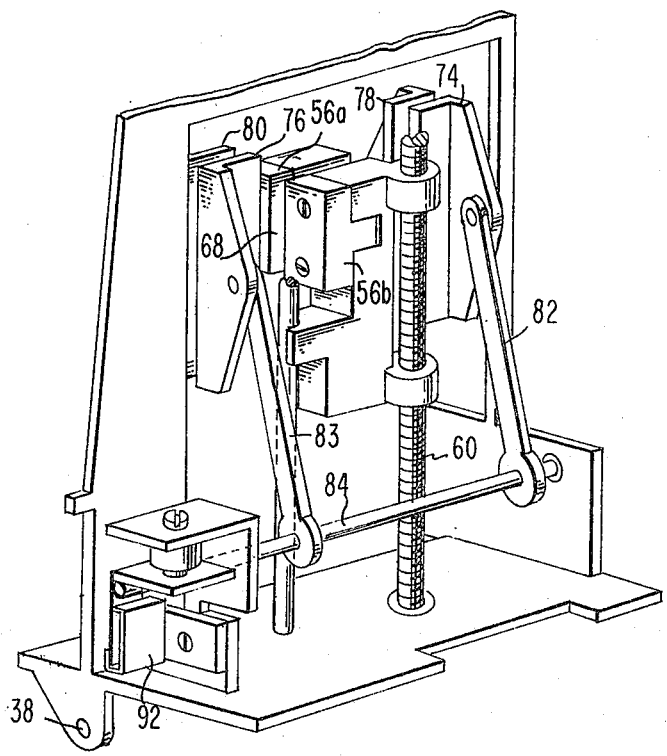

DATA STORAGE APPARATUS EMPLOYING A FLEXIBLE MAGNETIC DISK

CROSS REFERENCE TO RELATED APPLICATION

This is a continuation of application Ser. No. 406,137, filed Oct. 12, 1973, now abandoned.

This application is related to an application by James F. Elliott and Joel S. Johnson, Ser. No. 447,454, filed Mar. 1, 1974, for Data Storage Mechanism Having a Flexible Magnetic Disk.

BACKGROUND OF THE INVENTION

The invention relates to magnetic disk data storage apparatus and in particular to such storage apparatus employing flexible magnetic disks contained in protective envelopes therefor.

It has previously been proposed to provide data storage apparatus which employed a thin flexible magnetic disk contained in an envelope, such as in Dalziel et al. U.S. Pat. No. 3,678,481. In this prior construction, only one side of the magnetic disk was used for receiving information and the information was imparted to this side of the disk by means of a magnetic read/write head. A pressure pad was axially disposed with respect to the read/write head and was effective on the other side of the disk.

SUMMARY OF THE INVENTION

It is an object of the invention to provide an improved storage file utilizing a flexible disk encased in a protective envelope and which allows both sides of the disk to have information encoded thereon and readable therefrom.

It is a still more particular object of the invention to provide a pair of read/write magnetic heads on opposite sides of the flexible disk and improved supporting mechanism for the disk and more particularly for the protective envelope for the disk which causes the disk to be in firm uniform contact with the magnetic head on either side of the disk so that information may be reliably encoded on or read from either side of the disk.

In a preferred embodiment, a stationary frame is provided with opposite slots into which the disk encased in its protective envelope may be moved. The frame carries a disk engaging drive shaft and a cover is hingedly mounted on the frame and carries a rotatable collet for engaging the disk between the shaft and collet when the cover is closed with respect to the frame. A U-shaped carriage embraces the disk and protective envelope and has read/write heads in its two arms which are adapted to extend through slots provided in the envelope to engage with the magnetic surfaces on the disk. The carriage is slidably disposed on a vertical stationary support rod, and a rotatable screw extends through the carriage for moving the carriage vertically whereby to bring the read/write heads to register with different magnetic tracks on the disk surfaces. A pair of pads embrace and are spaced from the head assembly on one side of the disk, and a similar pair of pads are disposed on the other side of the disk. The pair of pads on one side of the disk are moved forwardly to move the envelope and disk in the same direction to bring the disk into contact with the read/write head on the other side, and a similar pair of pads are provided on the latter side of the disk for moving the disk into contact with the read/write head on the first side of the disk.

BRIEF DESCRIPTION OF THE DRAWINGS

FIG. 7 is a side elevational view of the magnetic disk-envelope assembly together with the front pads (in the left of the figure) and back pads (in the right of the figure) which move the disk into recording engagement with the read/write heads;

FIG. 8 is a perspective view of the base frame, the pads, the carriage for the heads, and the disk-envelope assembly, viewing these parts from the back;

FIG. 9 is a side elevational view of the head carriage and the two read/write heads carried by the carriage and taken from line 9—9 of FIG. 6.

DESCRIPTION OF THE PREFERRED EMBODIMENT

Figure 1:
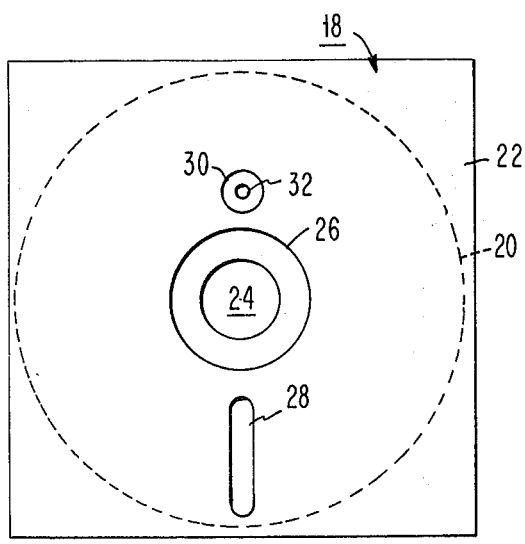
FIG. 1 is a plan view of a flexible magnetic disk with its enclosing protective envelope which may be used with the apparatus of the invention.
Figure 2:
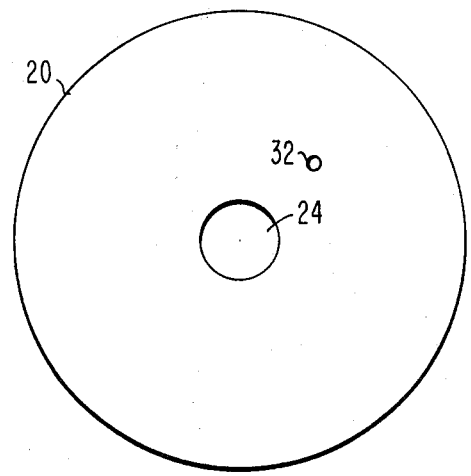
FIG. 2 is a plan view of the magnetic disk, removed from its protective envelope.

Referring to FIGS. 1 and 2 in particular, the magnetic disk assembly 18 utilized by the data storage apparatus of the invention may be seen to comprise a magnetic disk 20 disposed within a square envelope 22. The disk 20 is of a thin flexible material, such as of polyethylene terephthalate of about 0.003 inch thickness, and the disk 20 has an unoriented $FE_2O_3$ coating on both sides. The envelope 22 may be of rigid vinyl sheet material of 0.010 inch thickness, for example. The disk 20 has a central opening 24, and the envelope 22 has larger central openings 26 in its two thicknesses. In addition, the envelope 22 has aligned radial slots 28 and aligned round openings 30 in its two thicknesses. The openings 30 are adapted to align with an opening 32 in the disk 20 as the disk 20 rotates within the envelope 22. An assembly of this type is disclosed in U.S. Pat. No. 3,668,658 issued June 6, 1972, which may be referred to for more detail.

Figure 3:
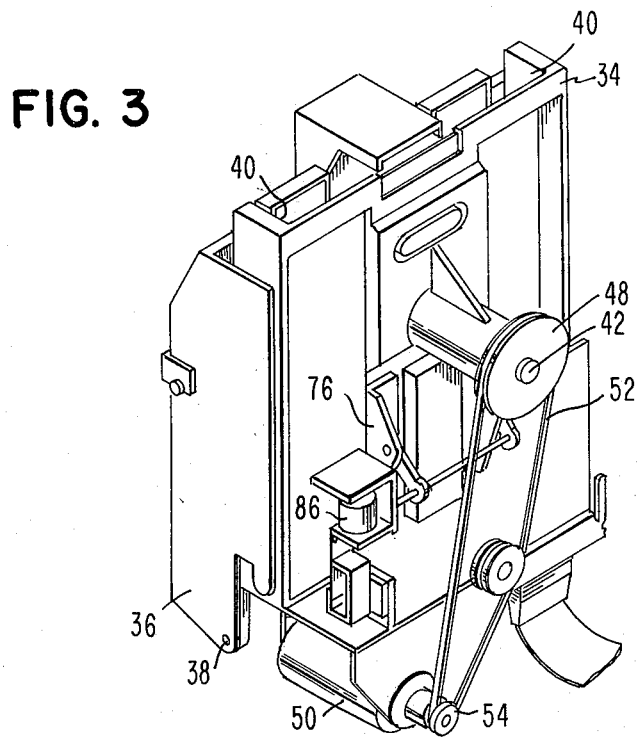
FIG. 3 is a perspective view of the data storage apparatus, of the invention, viewing the data storage apparatus and the base frame of the apparatus from the back.
Figure 4:
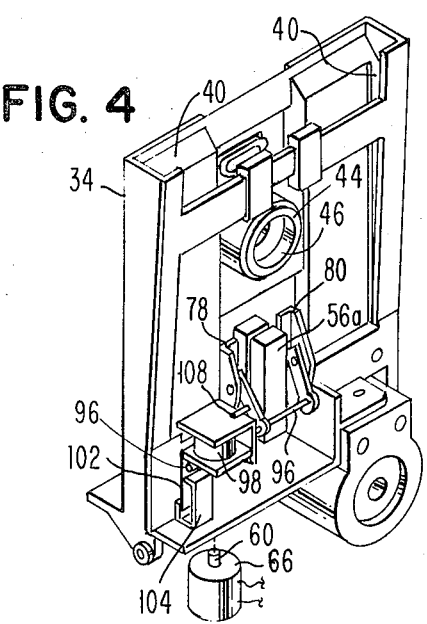
FIG. 4 is a perspective view of the base frame of the storage apparatus, viewing the base frame of the apparatus from its inside.

The data storage apparatus includes a backbone or base frame 34 having a cover 36 swingably mounted thereon by means of a hinge 38. The frame 34 is formed with a pair of opposite downwardly tapering slots 40 for receiving a cartridge assembly 18. A shaft 42 is rotatably mounted in the frame 34 and is formed with a rim 44 (see FIG. 4) and a central countersunk depression 46 on one end. A pulley 48 (see FIG. 3) is fixed on the other end of the shaft 42, and the pulley 48 is driven from a drive motor 50 located on the bottom of the frame 34 by means of a belt 52 which extends around the pulley 48 and the output pulley 54 of the motor 50.

The cover 36 has a tapered collet 55 rotatably mounted therein, and the collet 55 is adapted to enter the countersunk depression 46 in the end of the shaft 42 when the cover 36 is swung toward the frame 34 so as to capture a disk 20 between the collet 55 and the rim 44 for driving the disk. Any suitable latching means (not shown in detail) may be used for holding the cover 36 in this position clamping a disk 20 between the collet 55 and the rim 44.

Figure 6:
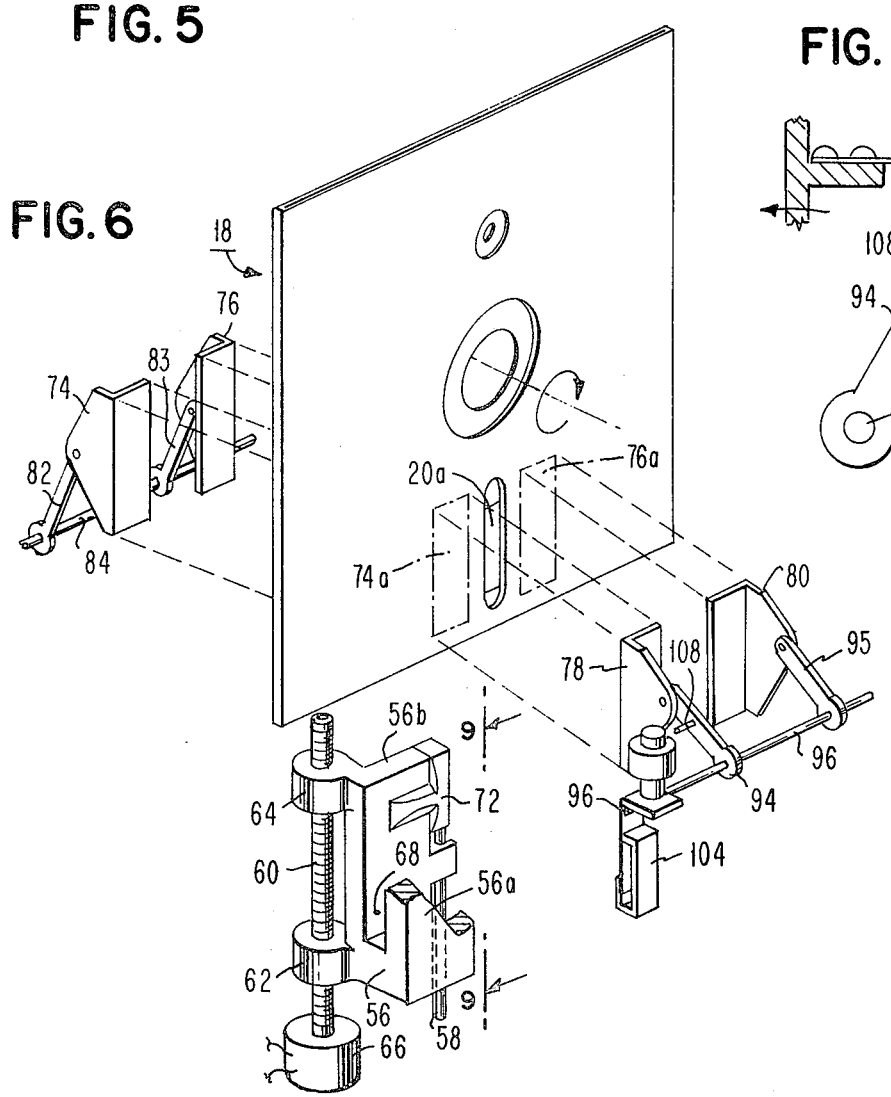
FIG. 6 is an exploded view of the disk and its protective envelope together with movable front pads (in the front of the figure) and movable back pads (in the back of the figure) which are supported from the base frame for moving the protective envelope and disk into recording and reading dispositions with respect to read/write heads which are fixed axially of the heads.

A U-shaped carriage 56 is carried by the frame 34 and is longitudinally movable on a vertical guide rod 58 fixed in the frame 34. A lead screw 60 extends through lug portions 62 and 64 of the carriage 56 (see FIG. 6) and has screw threaded engagement with corresponding screw threads formed within the lug portions 62 and 64. A motor 66 is provided on the bottom of the frame 34 for rotating the screw 60 so as to move the carriage 56 upwardly or downwardly on the rod 58.

The carriage 56 has a slot 68 therein which receives the disk assembly 18 and which is formed by a front arm portion 56a and a back arm portion 56b of the carriage 56. Transducer heads 70 and 72 are respectively carried by the arm portions 56a and 56b and have their data recording and reading surfaces on the internal faces of the arm portions 56a and 56b.

Back pads 74 and 76 are disposed on opposite sides of the carriage 56 on one side of the assembly 18 when in place, and corresponding front pads 78 and 80 are disposed on opposite sides of the carriage 56 and on the other side of the disk assembly 18. The pads 74 and 76 are adapted to be moved into contact with the envelope 20 at contact areas 74a and 76a in particular; and the pads 78 and 80 are likewise capable of being moved into contact with the opposite face of the envelope 22 at contact areas corresponding to but just opposite the areas 74a and 76a.

The pads 74 and 76 are swingably disposed on arms 82 and 83 which are fixed to a shaft 84. The shaft 84 is rotatably carried by the frame 34. An electromagnet 86 is provided for rotating the shaft 84, and a magnet armature 88 fixed to the shaft 84 is provided for this purpose. A leaf spring 90 is fixed at one end to the shaft 84 and engages at its other end a spring mount 92 that is fixed with respect to the frame 34. The mount 92 has a portion 92a overlying the extreme end of the spring 90 and has an outwardly extending lug portion 92b that is adapted to engage the spring 90 at a point considerably closer to the shaft 84.

The front pads 78 and 80 are mounted and moved by mechanisms similar to that provided for mounting and moving the pads 74 and 76. The pads 78 and 80 are swingably disposed on arms 94 and 95 (see FIG. 6) that are fixed to a shaft 96 rotatably carried by the frame 34. An electromagnet 98 is effective for rotating the shaft 96 by means of a magnet armature 100 that is fixed to the shaft 96. A leaf spring 102 is fixed to the shaft 96, and a spring mount 104 similar to the mount 92 is provided for the spring 102.

Figure 5:
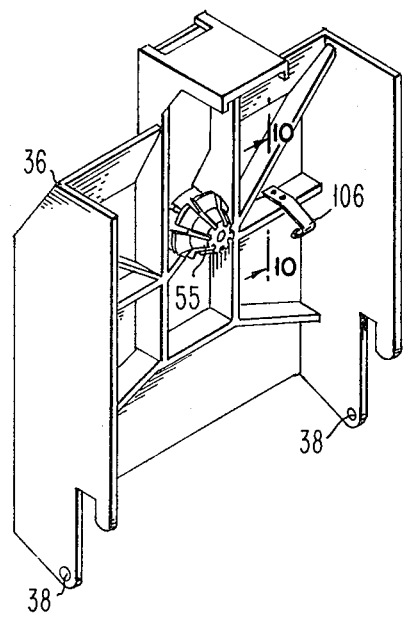
FIG. 5 is a perspective view of a cover which is hinged on the base frame and viewing the cover from its inside.
Figure 10:
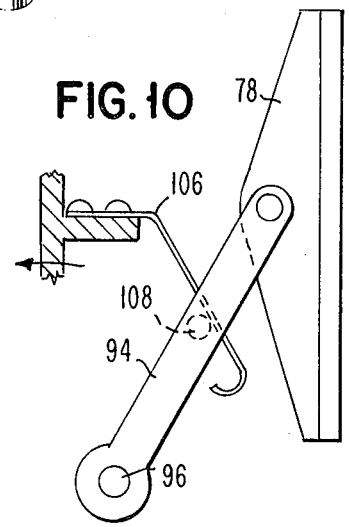
FIG. 10 is a sectional view on an enlarged scale taken on line 10—10 of FIG. 5.

The cover 36 carries a leaf spring 106 (see FIGS. 5 and 10) which overlies a pin 108 fixed to the arm 94 carrying the pad 78 for moving the pads 78 and 80 as the cover 36 is opened.

In operation, the cover 36 is swung outwardly with respect to the frame 34; and the leaf spring 106, being in the form of a hook, hooks on to pin 108 and pulls front pads 78 and 80 frontwardly away from the back pads 74 and 76. The pads 78 and 80 move together with rotation of shaft 96 against the action of spring 102. A disk assembly 18 is then slid downwardly in the slots 40 so as to position the central opening 24 in the disk 20 approximately in alignment with the counterbore 46. The cover 36 is swung inwardly toward the frame 34, and the collet 55 is thereby moved through the disk opening 24 and into the counterbore 46. It will be noted that the collet 55 is tapered, and this movement of the collet 55 into the counterbore 46 has the effect of centralizing the disk 20 with respect to the central axis of the collet 55 and of the shaft 42. The disk 20 is at this time gripped between the collet 55 and the rim 44 on the shaft 42 so that the disk 20 is rotated within the stationary envelope 22 by means of the motor 50 driving through the belt 52 and the pulleys 54 and 48. The cover 36 is held in this position by suitable latching mechanism (not shown in detail).

Initially, neither of the electromagnets 86 and 98 is energized, and the springs 90 and 102 are approximately flat and hold the pads 74, 76, 78 and 80 in loose engagement (with substantially zero clearance) with the exterior surfaces of the envelope 22. Under these conditions, neither of the magnetic surfaces on the disk 20 engages with the read/write surface of the transducer 70 or the transducer 72 on the inner surfaces of the arm portions 56a and 56b.

When it is desired that information shall be either read from or written on the front surface 20a of the disk 20, the electromagnet 86 energized (see FIG. 7). The armature 88, shaft 84 and arms 82 and 83 are then moved by the action of the electromagnet 86 in the counterclockwise direction as seen in FIG. 7 so as to forcibly apply the pads 74 and 76 on the contact areas 74a and 76a of the adjacent outer surface of the envelope 22. This movement of the parts 88, 84, 82, 83, 76 and 74 is against the resilient action of the leaf spring 90 which then pivots about the abutment portion 92b of the mount 92 with the lower end of the spring 90 bearing against the portion 92a of the mount 92. The spring 90 is then in its dotted line condition as shown in FIG. 7. Since the abutment portion 92b located relatively close to the shaft 84 bears on the leaf spring 90, it is apparent that only the short length of the leaf spring 90 between the shaft 84 and the abutment portion 92b is effective to provide a return force on the shaft 84; and this return force thus is relatively high due to the short length of the spring 90 that is thus utilized.

The pads 74 and 76 in being forced against the disk assembly 18 move the front disk surface 20a against the transducer 70 carried by the arm portion 56a of the carriage 56. The transducer 70 extends through the slot 28 in the side of the envelope 22 adjacent the cover 36; and, therefore, as the disk 20 rotates, information may be written on this disk surface 20a or may be read from this disk surface. Since the pads 74 and 76 are located on opposite sides of the transducer 70, the disk 20 is moved into firm engagement with the transducer 70 so that transducer 70 slightly penetrates disk 20; and dependable writing or reading occurs using the transducer 70.

A restraint on the movement of the disk assembly in the direction toward the arm portion 56a and under the influence of the pads 74 and 76 is provided by the pads 78 and 80. The pads 78 and 80 are moved slightly to the left as seen in FIG. 7, and the shaft 96 and arms 94 and 95 move correspondingly in the counterclockwise direction. This movement is against the flexing action of the spring 102 which in this case does not contact the abutment portion 104b but is out of engagement with this abutment portion, with only the return bent portion 104a of the mount 104 being effective on the extreme lower end of the leaf spring 102. The complete length of the spring 102 is thus flexed, as is shown in dotted lines in FIG. 7, and the spring 102 provides less return force on the shaft 96 than is provided by the spring 90 on the shaft 84. The pads 78 and 80 thus bear with a very light pressure on the disk assembly 18 just sufficient to stabilize the disk assembly 18 in its proper position with the disk surface 20a bearing with the proper pressure on the transducer 70 for a reliable reading or writing action by the transducer 70. The actual force of the transducer 70 on the disk 20 is actually a function of the resilience of the disk 20 since the disk 20 is bowed around transducer 70 against the resilience of the disk. The disk 20 is very thin as above described and thus has a low spring constant or resilience, and the disk 20 can be moved more or less into the transducer 70 with a relatively great tolerance while still maintaining reliable reading and writing action. It may be noted in this connection that the portion of the envelope 22 at the side edges of the slot 28, through which the transducer 70 extends, imparts some support to the disk 20.

When it is desired to discontinue the reading or writing action with respect to the disk surface 20a, the electromagnet 86 is de-energized; and the parts return to their positions shown in FIG. 7. As above mentioned, the spring 90 provides a greater return force on the shaft 84 than does the spring 96, when the electromagnet 86 is energized; and, therefore, the spring 90 is effective to rotate the shaft 84 and connected parts in the clockwise direction. At the same time, the straightening action of the spring 102 brings the parts connected with the shaft 96 back to their FIG. 7 neutral positions.

When it is desired that the back side 20b of the disk 20 be used for the reading or writing action, utilizing the transducer 72; the electromagnet 98, instead of the electromagnet 86, is energized. The pads 78 and 80 in this case move the other side 20b of the disk 20 in rather forceful engagement with the active surface of the transducer 72, and the side 20b of the disk 20 is then in effective engagement with the transducer 72 in the same manner that the transducer 70 was made effective when the electromagnet 86 was energized. With the electromagnet 98 being energized, the pads 74 and 76 are the backup pads and assure the proper pressure of the disk 20 on the active surface of the transducer 72. In this case, both of the shafts 84 and 96 and the connected parts rotate slightly in the clockwise direction, as seen in FIG. 7, similarly as in the first mentioned case in which the direction of rotation of the shafts 84 and 96 was in the counterclockwise direction.

It will be apparent that, in order to access different tracks on either of the disk faces, it is only necessary that the screw 60 be rotated so as to move the transducer 70 or the transducer 72 longitudinally within the slot 28 in which the transducer is positioned. This is preferably done while the transducer 70 or the transducer 72 remains in contact with the disk 20.

The data storage apparatus of the invention advantageously utilizes the carriage or head 56 carrying the read/write transducers 70 and 72 which is fixed in directions normal to the disk 20 by screw 60 and rod 58, being movable only longitudinally with rotation of screw 60 so that the transducers 70 and 72 may be effective with respect to different tracks on the disk surfaces. The pads 74 and 76, which are spaced somewhat from the transducer 70 along the surfaces of the disk 20, are effective to apply force on to the disk at the spaced contact areas 74a and 76a so that the disk 20 is bent around the active surface of the transducer 70 to have a firm reliable reading and writing engagement with the opposite surface of the disk. In this case, the opposite pads 78 and 80 provide a relatively light restraining force on the disk assembly 18. This same action occurs but in the opposite manner when the electromagnet 98 is energized to render the pads 78 and 80 the disk assembly moving means.

I claim:

1. A magnetic storage device comprising a thin flexible magnetic disk, means for rotating said disk, a pair of magnetic heads located opposite each other and at opposite faces of said disk, means for holding said magnetic heads against movement in directions normal to said disk, a first pair of pressure pads fixed together and located at one face of said disk on opposite sides of and spaced from said head at that side of the disk, a second pair of pressure pads fixed together and located at the other face of said disk and on opposite sides of and spaced from said head at that side of the disk and located directly opposite and in register with said first pair of pressure pads respectively, motor means for moving each of said pairs of pads as a unit forwardly toward said magnetic head located at the opposite face of said disk, and means for yieldably mounting each of said pairs of pads so that each of said pairs of pads may yield and move backwardly under the force exerted by the opposite pair of said pads in moving forwardly so that said opposite pair of pads may force the disk onto and around said magnetic head on the same side of said disk as the backwardly moving pads for a firm data transferring contact on said disk with this magnetic head, said means for yieldably mounting each of said pairs of pads including a spring means which allows this pair of pads to move backwardly and which resists the action of the motor means for this pair of pads in moving this pair of pads forwardly, said spring means for each pair of pads being constructed so that it has a relatively high spring rate for resisting the action of the motor means for this pair of pads in moving this pair of pads forwardly and a relatively low spring rate for movement of this pair of pads backwardly.

2. A magnetic storage device comprising a thin flexible magnetic disk, an envelope encasing said magnetic disk and provided with slots therethrough in opposite faces of the envelope which are in registry with each other, means for rotating said disk within said envelope, a pair of magnetic heads, a carriage on which said heads are fixed so as to hold the heads located opposite each other and at opposite faces of said disk and in registry with said slots in said envelope, means for holding said carriage and thereby holding said magnetic heads to prevent movement of the heads in directions normal to said disk, a first pair of pressure pads fixed together and located at one face of said envelope on opposite sides of and spaced from said slot in that face of said envelope, a second pair of pressure pads fixed together and located at the other face of said envelope and on opposite sides of and spaced from said slot in that face of the envelope and located directly opposite and in registry with said first pair of pressure pads respectively, motor means for moving each of said pairs of pads as a unit forwardly toward said magnetic head located at the opposite face of said disk, and means for yieldably mounting each of said pairs of pads so that each of said pairs of pads may yield and move backwardly under the force exerted by the opposite pair of said pads in moving forwardly so that said opposite pair of pads may move said envelope forwardly and thereby force said disk onto and around said magnetic head on the same side of said disk as the backwardly moving pads for a firm data transferring contact of said disk with this magnetic head.

3. A magnetic storage device for use with a disk-envelope assembly, said assembly including a thin flexible magnetic disk and an envelope encasing said disk with said envelope being provided with a pair of elongate slots extending through opposite faces of the envelope and extending radially toward the center of the disk and located in registry with each other, said envelope having a pair of opposite central openings therethrough in its said opposite faces, said storage device comprising:

frame means providing a pair of opposite slots into which said disk-envelope assembly may be moved, rotatable drive means carried by said frame means and adapted to extend through said opposite central openings in said envelope so as to engage with said disk within the envelope when said disk-envelope assembly is positioned in said slots, means for rotating said drive means for thereby rotating said disk in the envelope when said disk-envelope assembly is positioned in said slots, a pair of magnetic heads, a carriage on which said magnetic heads are fixed and locating said heads opposite each other and at opposite faces of said disk and in registry with said slots in said envelope when said disk-envelope assembly is positioned in said slots, means for holding said carriage and for thereby holding said magnetic heads to prevent their movement in directions normal to said disk when said disk-envelope assembly is positioned in said slots, means for moving said carriage and for thereby moving said heads toward and away from said rotatable driving means so as to move said heads in said slots of said envelope and toward and away from the center of the disk when said disk-envelope assembly is positioned in said slots, a first pair of pressure pads fixed together and located at one face of said envelope on opposite sides of and spaced from said head at that side of the disk so that the pressure pads are located on opposite sides of and spaced from said slot in said envelope at that side of the disk when said disk-envelope assembly is positioned in said slots, a second pair of pressure pads fixed together and located on opposite sides of and spaced from said head at that side of the disk and located directly opposite and in register with said first pair of pressure pads respectively, motor means for moving each of said pairs of pads as a unit forwardly toward said magnetic head located at the opposite face of said disk, and means for yieldably mounting each of said pairs of pads so that each of said pairs of pads may yield and move backwardly under the force exerted by the opposite pair of said pads in moving forwardly so that said opposite pair of pads may move said disk-envelope assembly forwardly and may force the disk onto and around said magnetic head on the same side of said disk as the backwardly moving pads when said disk-envelope assembly is positioned in said slots for a firm data transferring contact of said disk with this magnetic head.

* * * * *